US00RE41723E

(19) United States
(12) Reissued Patent
Olson et al.

(10) Patent Number: US RE41,723 E
(45) Date of Reissued Patent: Sep. 21, 2010

(54) COOLING TOWER SUPPORT GRID

(75) Inventors: Lloyd Olson, St. Albert (CA); Nicolaos Papadopoulos, Edmonton (CA)

(73) Assignee: Integrid Inc., Edmonton (CA)

(21) Appl. No.: 11/364,794

(22) Filed: Feb. 28, 2006

Related U.S. Patent Documents

Reissue of:
(64) Patent No.: 6,708,960
Issued: Mar. 23, 2004
Appl. No.: 09/902,090
Filed: Jul. 10, 2001

(51) Int. Cl.
*B01F 3/04* (2006.01)

(52) U.S. Cl. ..... 261/111; 261/DIG. 11; 52/664

(58) Field of Classification Search ..... 261/111, 261/113, DIG. 11; 52/664, 665
See application file for complete search history.

(56) References Cited

U.S. PATENT DOCUMENTS 3,879,502 A * 4/1975 Furlong et al. ..... 261/111
3,924,380 A * 12/1975 Quaadvliet ..... 52/664
4,133,851 A * 1/1979 Ovard ..... 261/111
4,178,333 A * 12/1979 Shepherd ..... 261/111
4,512,937 A * 4/1985 Hoffmann ..... 261/111
4,515,735 A * 5/1985 Phelps ..... 261/111
4,557,878 A * 12/1985 Fulkerson ..... 261/111
4,576,764 A * 3/1986 Shepherd et al. ..... 261/111
4,578,227 A * 3/1986 Ovard ..... 261/111
4,663,092 A * 5/1987 Kinney, Jr. et al. ..... 261/111
4,774,034 A * 9/1988 Fritz ..... 261/111
4,803,018 A * 2/1989 Lefevre et al. ..... 261/111
4,868,956 A * 9/1989 Shepherd ..... 24/336
4,915,877 A * 4/1990 Shepherd ..... 261/111
4,996,008 A * 2/1991 Peterson ..... 261/111
5,017,309 A * 5/1991 Peterson ..... 261/111
5,454,987 A * 10/1995 Cornwell, Jr. ..... 261/111
5,811,035 A * 9/1998 Mockry ..... 261/111
6,083,441 A * 7/2000 Ptaschek et al. ..... 264/159
6,293,527 B1 * 9/2001 Ovard ..... 261/111
2003/0011083 A1 * 1/2003 Olson et al. ..... 261/111

FOREIGN PATENT DOCUMENTS

AU 33145 * 3/1999

* cited by examiner

*Primary Examiner*—Scott Bushey
(74) *Attorney, Agent, or Firm*—Howrey LLP

(57) ABSTRACT

A cooling tower support grid includes a lattice frame having a first series of bars which intersect a second series of bars to form a plurality of openings. Splash bar retaining clips are integrally formed as part of the lattice frame extending in opposed relation into each of the openings. This eliminates the need to handle separate retaining clips and, thereby, simplifies the installation process.

22 Claims, 8 Drawing Sheets

COOLING TOWER SUPPORT GRID

Matter enclosed in heavy brackets [ ] appears in the original patent but forms no part of this reissue specification; matter printed in italics indicates the additions made by reissue.

*This application is a Reissue of application Ser. No. 09/902,090, filed Jul. 10, 2001, and issued as U.S. Pat. No. 6,708,960 on Mar. 23, 2004.*

FIELD OF THE INVENTION

The present invention relates to a cooling tower support grid for supporting splash bars.

BACKGROUND OF THE INVENTION

Cooling tower support grids are used to support splash bars which span across a cooling tower, so that the splash bars do not sag. The splash bars are offset both vertically and horizontally, so that water droplets falling vertically from near the top of the cooling tower will invariably strike one or more of the splash bars during descent. Large water droplets are broken into smaller water droplets upon striking one of the splash bars. As many water droplets strike the splash bars, a thin film of water tends to form on each splash bar which increases the surface area of water exposed to air.

There is a tendency for splash bars to become dislodged due to impingement by water from above, forced air flow from below and vibration caused by fans used to circulate air within the cooling tower. To guard against the splash bars becoming dislodged, the splash bars are commonly secured to the support grid by clips.

An example of a support grid is U.S. Pat. No. 4,178,333 (Shepherd). Examples of splash bars are U.S. Pat. No. 4,663,092 (Kinney Jr. et al) and U.S. Pat. No. 5,454,987 (Cornwell Jr.). Examples of clips are U.S. Pat. No. 4,774,034 (Fritz) and U.S. Pat. No. 4,868,956 (Shepherd).

SUMMARY OF THE INVENTION

The present invention relates to an alternative configuration for a cooling tower support grid.

According to the present invention there is provided a cooling tower support grid which includes a lattice frame having a first series of bars which intersect a second series of bars to form a plurality of openings. Splash bar retaining clips are integrally formed as part of the lattice frame extending in opposed relation into each of the openings.

The cooling tower support grid, as described above, turns what formerly was a three component system consisting of support grid, splash bars and clips into a two component system. The need to handle clips is eliminated as they are integrally formed as part of the support grid. There are a variety of suitable moldable materials that can be used. Beneficial results have been obtained by injection molding polymer plastic.

The lattice frame can be made in a various configurations. Beneficial results have been obtained when the first series of bars are in parallel spaced relation and the second series of bars are in parallel spaced relation.

The type of clips used depends upon which of a variety of alternative configurations of splash bars are to be used with the support grid. Beneficial results have been obtained when the clips have a resilient finger. It is preferred that the resilient finger be angled upwardly and terminate in a downwardly bent portion.

The clips are more versatile and can be used with a wider variety of splash bar configurations, as will hereinafter be further described, when the clips have a lower retainer. Beneficial results have be obtained through the use of a retainer lip.

The positioning of the clips within the openings can be varied to suit alternative splash bar configurations. Beneficial results have been obtained when each of the clips extends from one of the first series of bars above and immediately adjacent to one of the second series of bars.

It is desirable that the support grid be rapidly and easily installed in a cooling tower. Even more beneficial results have been obtained when an upper peripheral edge of the lattice frame has an integrally formed hook whereby the lattice frame is suspended to facilitate rapid installation. It is preferred that a lower peripheral edge of the lattice frame have depending tabs with openings, whereby the lattice frame is secured in position by extending fasteners through the openings.

The clips on the lattice frame of the cooling tower support grid must engage a plurality of cooling tower splash bars. It is preferred that each of the splash bars include a elongate channel-form body having a first end, a second end, and a plurality of flow-through apertures. The downwardly bent portion of the resilient finger engaging one of the plurality of flow-through apertures.

Although beneficial results may be obtained through the use of the splash bars, as described above, even more beneficial results may be obtained when the body has a first longitudinal edge and a second longitudinal edge; with both the first longitudinal edge and the second longitudinal edge having outwardly protruding engagement lips. This enables the engagement lips to be positioned between opposed ones of the lower retainer lips and the one of the second series of bars immediately adjacent to the clips.

Although there are various configurations of channel-form bodies that could be used, it is preferred that the bodies form a "C" channel. The reason is that this enables the bodies to be used individually as an "open" channel or put together in face to face relation as a "closed" channel.

When the "C" channel splash bars are going to be used in face to face relation, it is preferred that several male members to be positioned along the first longitudinal edge and several female receptacles be positioned along the second longitudinal edge. This enables a pair of bodies to be secured in face to face relation by inserting the several male members of each of the pair of bodies into the several female receptacles of the other of the pair of bodies.

Cooling towers come in a different width dimensions. Even more beneficial results may, therefore, be obtained when the first end of each body has male members and the second end of each body has female members adapted to receive in mating relation the male members. This enables several of the bodies to be joined in end to end relation to create a splash bar of a length that is suited to the width of the cooling tower. There can be any number of male members. Of course, several spaced male members will provide a more uniform hold than a single male member can provide. Beneficial results have been obtained through the use of three male members: a first male member protruding from the first longitudinal edge, a second male member protruding from the second longitudinal edge and a third male member positioned intermediate the first male member and the second male member.

It would be undesirable for splash bars joined in end to end relation to separate. It is, therefore, preferred that each of the male members terminates in an engagement member and each of the female members terminates in a locking recess adapted to receive the engagement member. This structure provides a locking engagement whereby each of the male members remains engaged with the female members until sufficient force is applied to cause the engagement member to be released from the locking recess.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
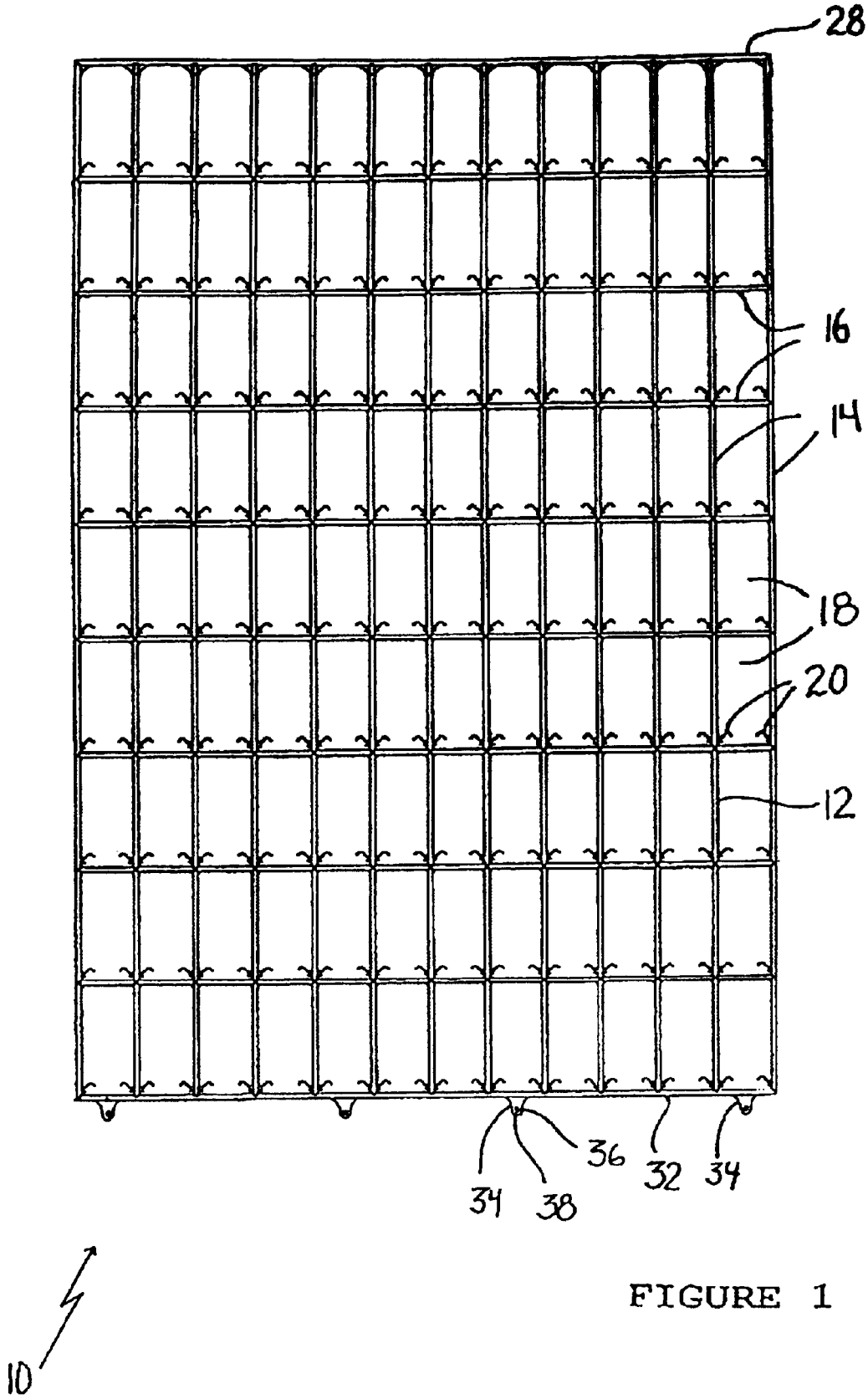
FIG. 1 is front elevation view of a cooling tower support grid constructed in accordance with the teachings of the present invention.

The preferred embodiment, a cooling tower support grid generally identified by reference numeral 10, will now be described with reference to FIGS. 1 through 9.

Structure and Relationship of Parts

Figure 7:
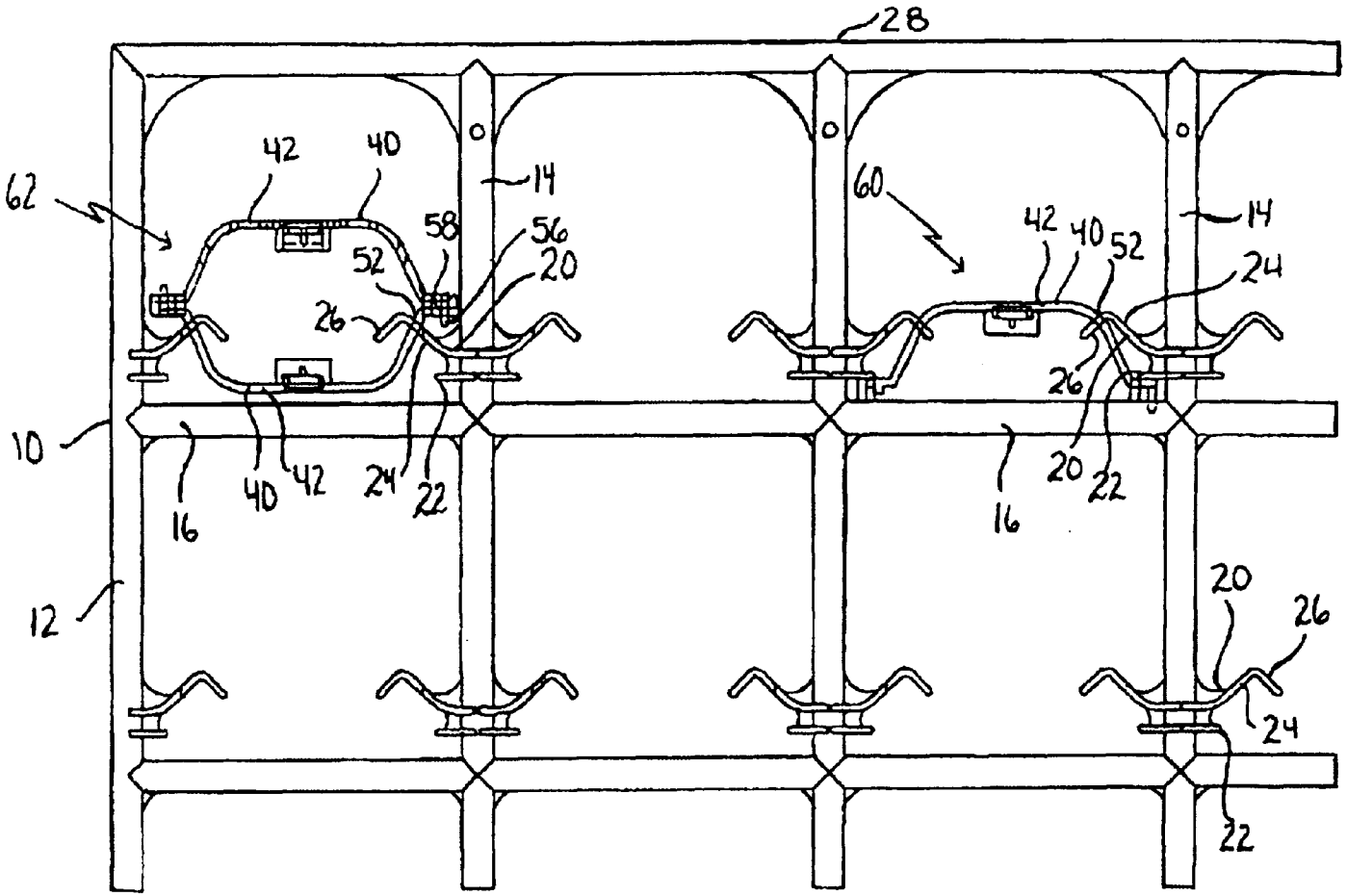
FIG. 7 is a detailed front elevation view of the cooling tower support grid illustrated in FIG. 1, engaged with two alternative configurations of splash bar.

Referring to FIG. 1, there is provided a cooling tower support grid 10 which includes a lattice frame 12 that has a first series of parallel bars 14 which intersect with a second series of parallel bars 16 to form a plurality of openings 18. Splash bar retaining clips 20 are integrally formed as part of lattice frame 12. Retaining clips 20 extend in opposed relation into each of openings 18. Each clip 20 extends from one of first series of bars 14 above and immediately adjacent to one of second series of bars 16. Referring to FIG. 7, each clip 20 has a lower retainer lip 22 and a resilient finger 24 which is angled upwardly and terminates in a downwardly bent portion 26.

Figure 8:
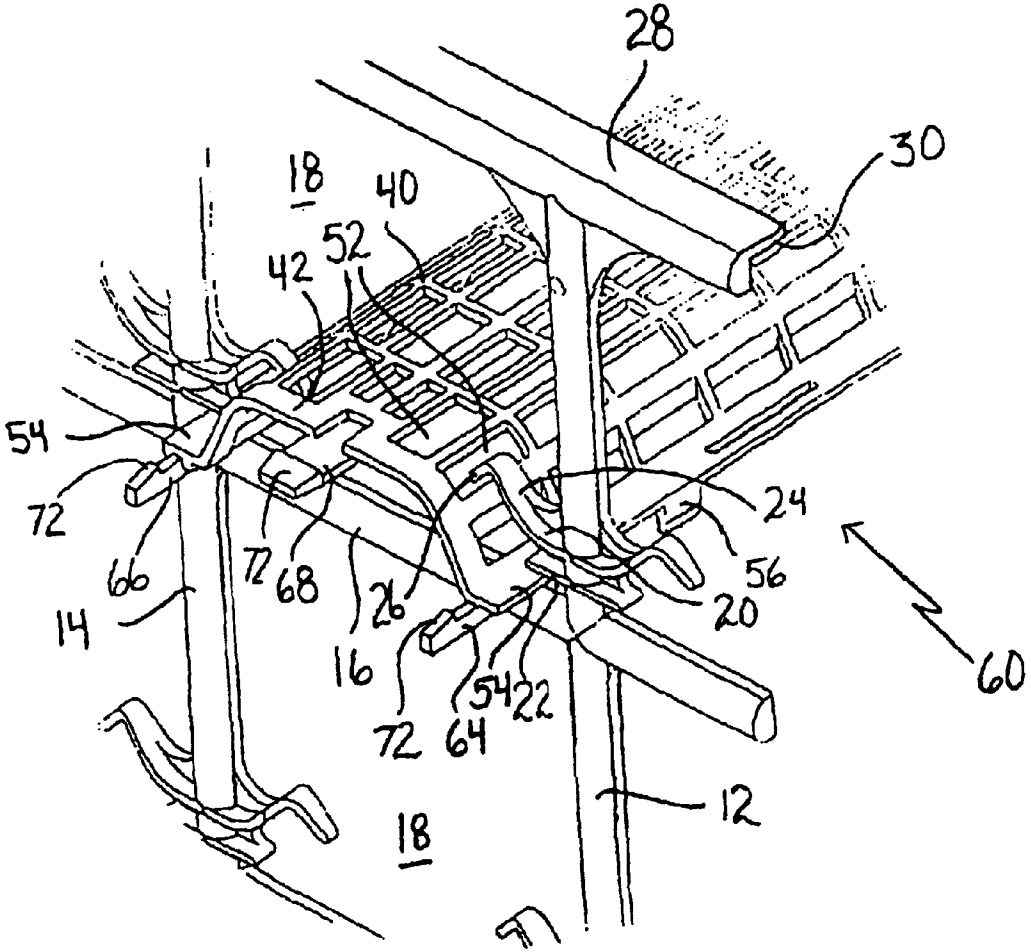
FIG. 8 is a detailed perspective view of the cooling tower support grid illustrated in FIG. 1, engaged with an open channel splash bar.

Referring to FIG. 8, an upper peripheral edge 28 of lattice frame 12 has an integrally formed hook 30 whereby lattice frame 12 is suspended. Referring to FIG. 1, a lower peripheral edge 32 of lattice frame 12 has depending tabs 34 with openings 36 whereby lattice frame 12 is secured in position by extending fasteners such as nails 38 through openings 36.

Figure 2:
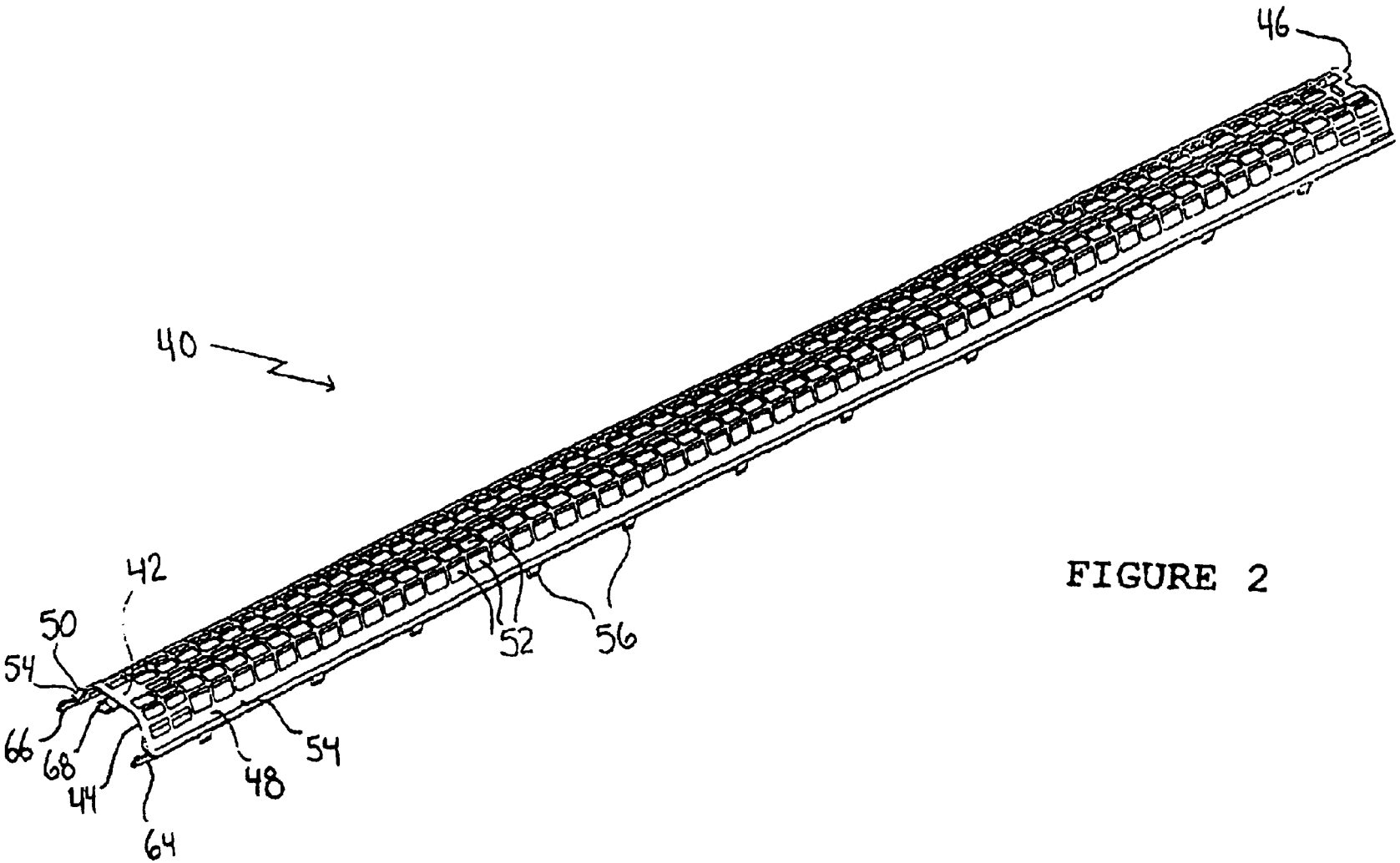
FIG. 2 is a perspective view of a cooling tower splash bar constructed in accordance with the teachings of the present invention.
Figure 3:
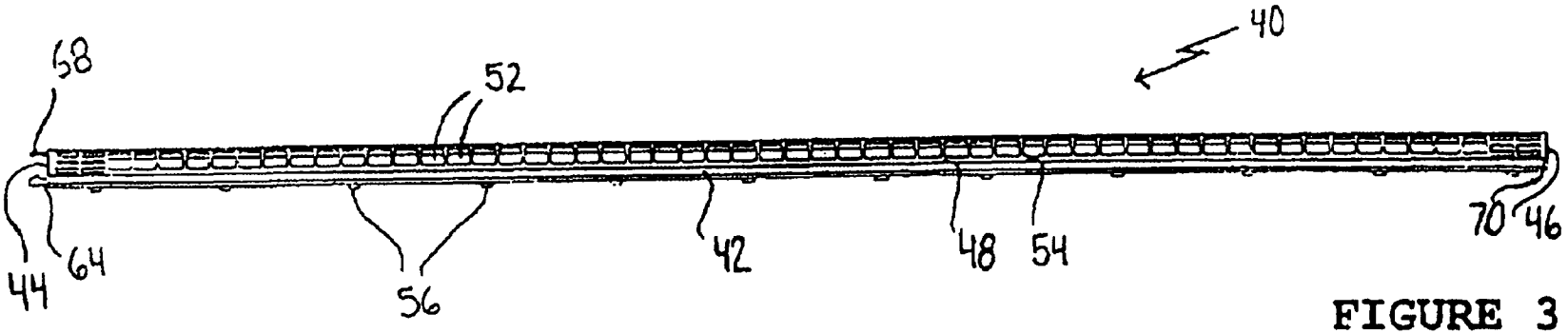
FIG. 3 is a side elevation view of the cooling tower splash bar illustrated in FIG. 2.
Figure 4:
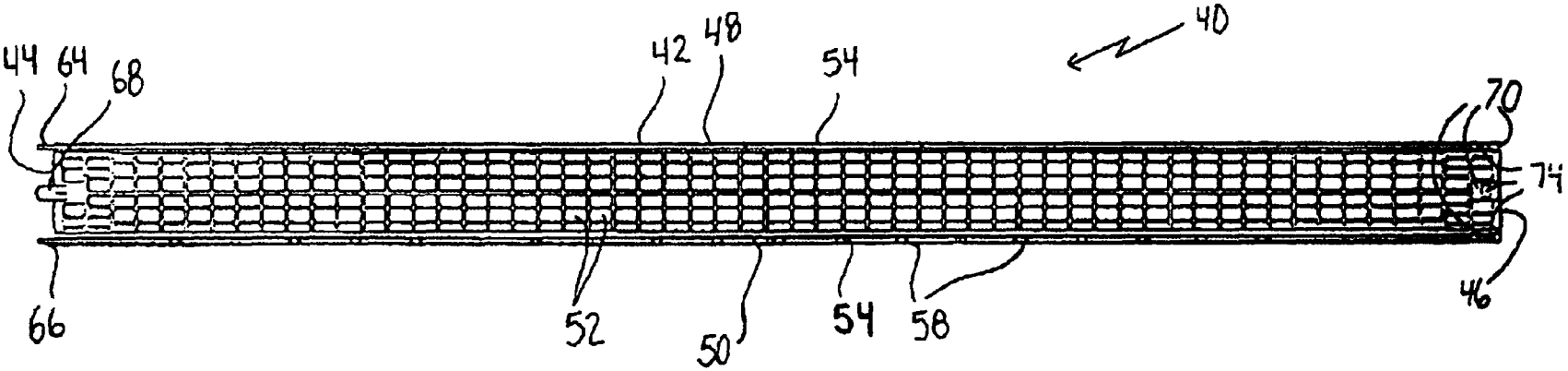
FIG. 4 is a bottom plan view of the cooling tower splash bar illustrated in FIG. 2.

Referring to FIG. 7, a plurality of cooling tower splash bars 40 are arranged on lattice frame 12. Referring to FIGS. 2, 3, and 4, each splash bar 40 includes an elongate "C" channel body 42 that has a first end 44, a second end 46, a first longitudinal edge 48, a second longitudinal edge 50 and a plurality of flow-through apertures 52. Both first longitudinal edge 48 and second longitudinal edge 50 have outwardly protruding engagement lips 54. Referring to FIG. 3, male members 56 are positioned along first longitudinal edge 48. Referring to FIG. 4, female receptacles 58 are positioned along second longitudinal edge 50.

Referring to FIG. 7, cooling tower splash bars 40 can be arranged in either an individually as an "open" channel 60 or alternatively, cooling tower splash bars 40 can be placed together in face to face relation as a "closed" channel 62. Referring to FIG. 8, to place splash bar 40 as an "open" channel 60, engagement lips 54 are positioned between opposed lower retainer lips 22 and one of second series of bars 16 immediately adjacent to clips 20 with downwardly bent portion 26 of each resilient finger 24 engaging one flow-through apertures 52. Referring to FIGS. 3, 4, 7 and 9, in order to assemble a "closed" channel 62, two of bodies 42 are secured in face to face relation by inserting male members 56 of each body 42 into female receptacles 58 of other body 42. Downwardly bent portion 26 of resilient fingers 24 engage flow-through apertures 52 to hold bodies 42 in position.

Figure 5:
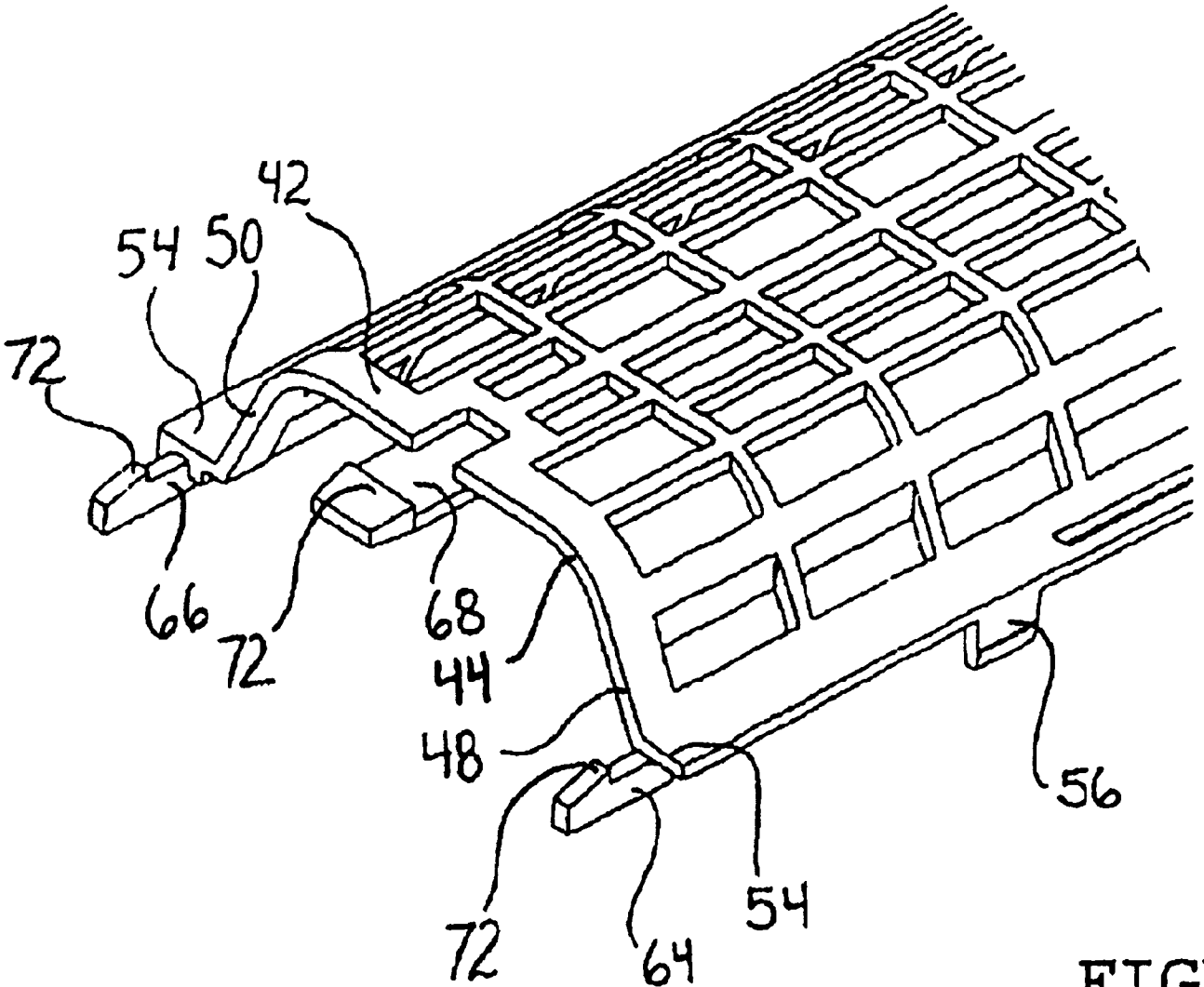
FIG. 5 is a detailed perspective view a first end of the cooling tower splash bar illustrated in FIG. 2, depicting male members.
Figure 6:
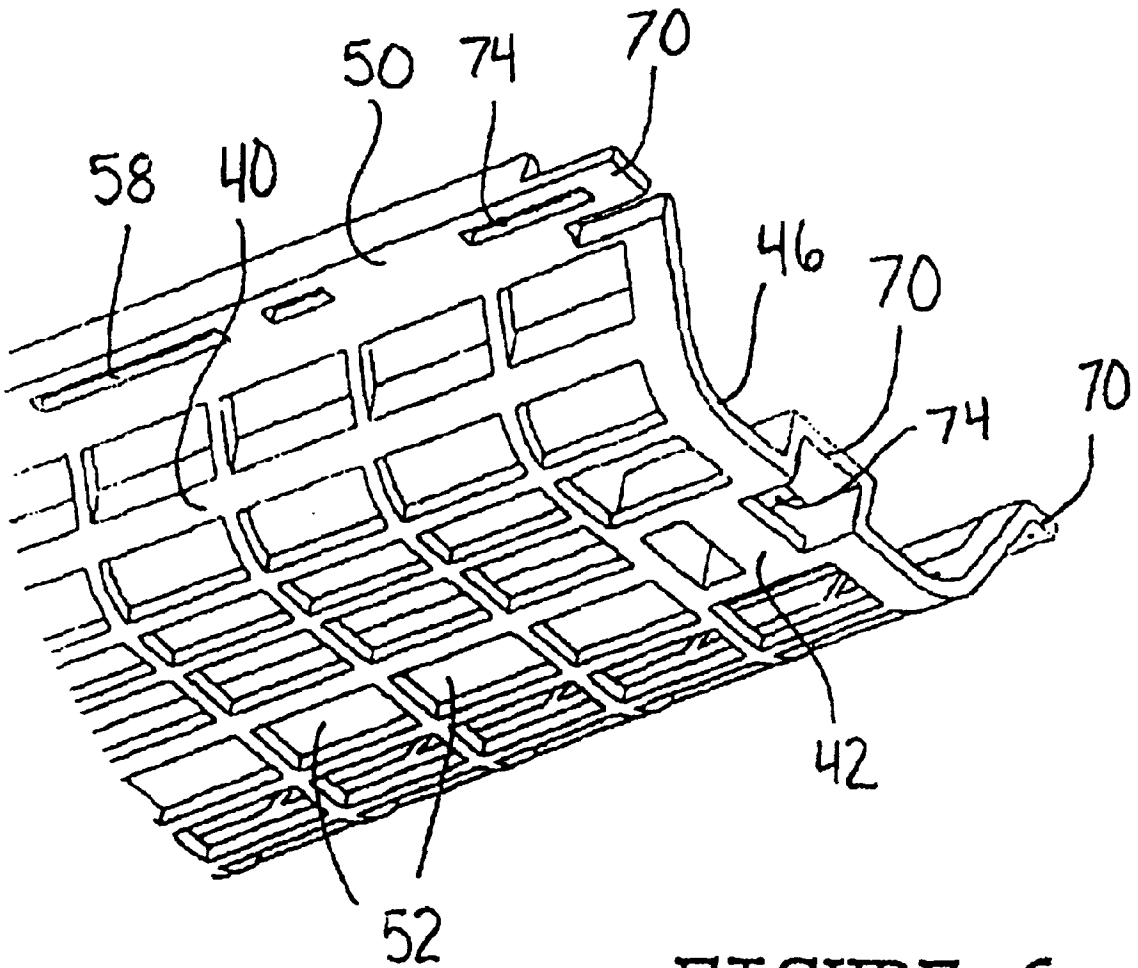
FIG. 6 is a detailed perspective view of the cooling tower splash bar illustrated in FIG. 2, depicting female members.

Referring to FIG. 5, first end 44 of each body 42 has a first male member 64 protruding from first longitudinal edge 48, a second male member 66 protruding from second longitudinal edge 50 and a third male member 68 positioned intermediate first male member 64 and second male member 66. It will be appreciated, however, that there can by any number of male members. Referring to FIG. 6, second end 46 of each body 42 has female members 70 that are adapted to receive in mating relation first male member 64, second male member 66, and third male member 68 so that several bodies 42 can be joined in end to end relation. Referring to FIG. 5, each of first male member 64, second male member 66, and third male member 68 terminate in an engagement member 72. Referring to FIGS. 4 and 6, each of female members 70 terminate in a locking recess 74 adapted to receive engagement member 72 of each of first male member 64, second male member 66 and third male member 68 such that they will remain engaged with female members 70.

Operation

The use and operation of cooling tower support grid 10 will now be described with reference to FIGS. 1 through 9. Referring to FIGS. 1 and 7, cooling tower support grids 10 are used to support splash bars 40. Support grids 10 are spaced across a cooling tower so that splash bars 40 do not sag. Splash bars are offset both vertically and horizontally on support grid 10, so that falling water droplets will invariably strike one or more of splash bars 40 during descent. As many water droplets strike splash bars 40, a thin film of water tends to form on each splash bar 40 which increases the surface area of water exposed to air.

Referring to FIGS. 1 and 8, hook 30 on upper peripheral edge 28 of support grid 10 and depending tabs 34 on lower peripheral edge 32 of support grid 10 allow for support grid 10 to be rapidly and easily installed in a cooling tower. Referring to FIG. 7, clips 20 are used to prevent splash bars 40 from becoming dislodged from support grid 10 due to impingement by water from above, forced air flow from below, or vibration cause by fans used to circulate air. As clips 20 are integrally formed as part of lattice frame 12, the need to handle loose clips 20 is eliminated.

Figure 9:
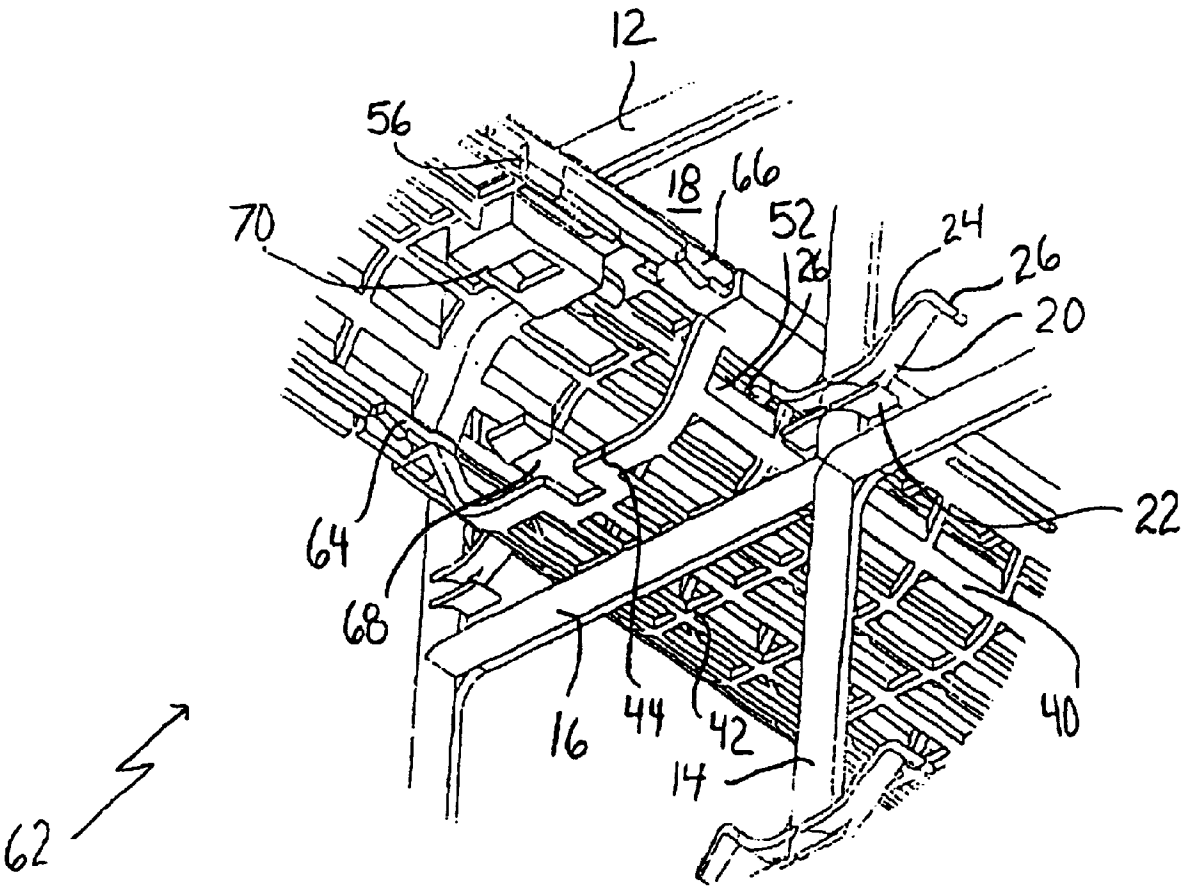
FIG. 9 is a detailed perspective view of the cooling tower support grid illustrated in FIG. 1, engaged with a closed channel splash bar.

Clips 20 allow for several alternative configurations of splash bars 40. For example, bodies 42 can be used individually to form an "open" channel 60. Alternatively, bodies 42 can be placed together in face to face relation as a "closed" channel 62. Referring to FIGS. 4 and 9, when placed in face to face relation, male members 56 of each body 42 are inserted into female receptacles 58 of other body 42.

To accommodate cooling towers of a variety of widths, bodies 42 of splash bars 40 are adapted to be joined in end to end relation to create splash bars 40 of a length that is suited for the width of a cooling tower. Referring to FIGS. 5 and 6, female members 70 at second end 46 of each body 42 are adapted to receive first male member 64, second male member 66 and third male member 68 on first end 44 of each body 42 for the purpose of securing bodies 42 in end to end relation. In the illustrated embodiment, three male members are provided, however it will be appreciated that any number of male members will work. It will also be appreciated that several spaced male members will provide a more uniform hold than a single male member could provide.

In order to prevent splash bars 40 that are joined in end to end relation from separating, locking recess 74 is provided in female members 70 that is adapted to receive engagement members 72 of first male member 64, second male member 66, and third male member 68 so that they remain engaged with female members 70 until sufficient force is applied to cause engagement member 72 to be released from locking recess 74.

Referring to FIG. 7, as a result, support grid 10, as described above, is quite versatile as it can be quickly and easily installed, and can support splash bars 40 in a variety of configurations.

Although in the illustrated embodiment, clips 20 are positioned immediately adjacent to and above bars 16, the positioning of clips 20 within openings 18 can be varied if alternative configurations of splash bar are used.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

[1. A cooling tower support grid, comprising:

a lattice frame having a first series of bars which intersect a second series of bars to form a plurality of openings;

splash bar retaining clips integrally formed as part of the lattice frame extending in opposed relation into each of the openings.]

[2. The cooling tower support grid as defined in claim 1, wherein the first series of bars are in parallel spaced relation and the second series of bars are in parallel spaced relation.]

[3. The cooling tower support grid as defined in claim 1, wherein the clips have a lower retainer.]

[4. The cooling tower support grid as defined in claim 3, wherein the lower retainer is a lip.]

[5. The cooling tower support grid as defined in claim 1, wherein each of the clips extends from one of the first series of bars above and immediately adjacent to one of the second series of bars.]

[6. The cooling tower support grid as defined in claim 1, wherein an upper peripheral edge of the lattice frame has an integrally formed hook whereby the lattice frame is suspended.]

7. A cooling tower support grid, comprising:

a lattice frame having a first series of parallel bars which intersect a second series of parallel bars to form a plurality of openings;

splash bar retaining clips integrally formed as part of the lattice frame extending in opposed relation into [each of the openings] *two laterally adjacent openings of the lattice frame*, each of the clips extending from one of the first series of bars above and immediately adjacent to one of the second series of bars, each of the clips having a lower retainer lip and a resilient finger which is angled upwardly and terminates in a downwardly bent portion.

8. The cooling tower support grid as defined in claim 7, wherein an upper peripheral edge of the lattice frame has an integrally formed hook whereby the lattice frame is suspended.

9. The cooling tower support grid as defined in claim 7, wherein a lower peripheral edge of the lattice frame has depending tabs with openings whereby the lattice frame is secured in position by extending fasteners through the openings.

10. The cooling tower support grid as defined in claim 7, wherein the lattice frame is combined with a plurality of cooling tower splash bars, each of the splash bars comprising:

an elongate channel-form body having a first end, a second end, and a plurality of flow-through apertures;

the downwardly bent portion of the resilient finger engaging one of the plurality of flow-through apertures.

11. The cooling tower support grid as defined in claim 10, wherein the body has a first longitudinal edge and a second longitudinal edge, both the first longitudinal edge and the second longitudinal edge having outwardly protruding engagement lips.

12. The cooling tower support grid as defined in claim 11, wherein the engagement lips are positioned between opposed ones of the lower retainer lips and the one of the second series of bars immediately adjacent to the clips.

13. The cooling tower support grid as defined in claim 10, wherein the body is a "C" channel.

14. The cooling tower support grid as defined in claim 10, wherein the first end of each body has male members and the second end of each body has female members adapted to receive in mating relation the male members whereby several of the bodies can be joined in end to end relation.

15. The cooling tower support grid as defined in claim 14, wherein each of the male members terminates in an engagement member and each of the female members terminates in a locking recess adapted to receive the engagement member, whereby each of the male members remain engaged with the female members until sufficient force is applied to cause the engagement member to be released from the locking recess.

16. The cooling tower support grid as defined in claim 11, wherein several male members are positioned along the first longitudinal edge and several female receptacles are positioned along the second longitudinal edge, whereby a pair of bodies can be secured in face to face relation by inserting the male members of each of the pair of bodies into the female receptacles of the other of the pair of bodies.

17. The cooling tower support grid as defined in claim 7, wherein the lattice frame is combined with a plurality of cooling tower splash bars, each of the splash bars comprising:

an elongate "C" channel body having a first end, a second end, a first longitudinal edge, a second longitudinal edge and a plurality of flow-through apertures, both the first longitudinal edge and the second longitudinal edge having outwardly protruding engagement lips;

the engagement lips being positioned between opposed ones of the lower retainer lips and the one of the second series of bars immediately adjacent to the clips, with the downwardly bent portion of each of the resilient fingers engaging one of the plurality of flow-through apertures.

18. The cooling tower support grid as defined in claim 7, wherein the lattice frame is combined with a plurality of cooling tower splash bars, each of the splash bars comprising:

an elongate "C" channel body having a first end, a second end, a first longitudinal edge, a second longitudinal edge and a plurality of flow-through apertures, several male members being positioned along the first longitudinal edge and several female members being positioned along the second longitudinal edge;

a pair of bodies secured in face to face relation by inserting the male members of each of the pair of bodies into the female receptacles of the other of the pair of bodies, the downwardly bent portion of each of the resilient fingers engaging one of the plurality of flow-through apertures to hold the pair of bodies in position.

19. The cooling tower support grid as defined in claim 17, wherein the first end of each body has male members and the second end of each body has female members adapted to receive in mating relation the male members whereby several of the bodies can be joined in end to end relation.

20. The cooling tower support grid as defined in claim 19, wherein each of the male members terminates in an engagement member and each of the female members terminates in a locking recess adapted to receive the engagement member, whereby each of the male members remain engaged with the female members until sufficient force is applied to cause the engagement member to be released from the locking recess.

21. The cooling tower support grid as defined in claim 14, wherein the body has a first longitudinal edge and a second longitudinal edge and there are three male members: a first male member protruding from the first longitudinal edge, a second male member protruding from the second longitudinal edge and a third male member positioned intermediate the first male member and the second male member.

22. The cooling tower support grid as defined in claim 21, wherein each of the male members terminates in an engagement member and each of the female members terminates in a locking recess adapted to receive the engagement member, whereby each of the male members remain engaged with the female members until sufficient force is applied to cause the engagement member to be released from the locking recess.

*23. A cooling tower support grid, comprising:*

*a lattice frame having a first series of bars which intersect a second series of bars to form a plurality of openings;*

*splash bar retaining clips integrally formed as part of the lattice frame, the retaining clips being placed into at least two laterally spaced openings of the lattice frame; and*

*each of the retaining clips having an engaging portion extended from the lattice frame, the engaging portion adapted to engage the splash bar to selectively secure the splash bar against the lattice frame,*

*in which the engaging portion is extended from the lattice frame by an extending member to extend the engaging portion from one of the second series of bars,*

*in which the engaging portion comprises a resilient finger angled upwardly.*

*24. The cooling tower support grid of claim 23 or 28, in which the resilient finger further comprises a downwardly bent portion.*

*25. A cooling tower support grid, comprising:*

*a lattice frame having a first series of bars which at least substantially perpendicularly intersect a second series of bars to form a plurality of openings; and*

*splash bar retaining clips integrally formed as part of the lattice frame, the retaining clips being placed into two laterally adjacent openings of the lattice frame,*

*each of the retaining clips having a downward portion, the downward portion adapted to engage the splash bar to selectively secure the splash bar against the lattice frame,*

*in which each of the splash bar retaining clips further comprises a resilient finger angled upwardly and terminating in the downward portion.*

*26. The cooling tower support grid of claim 25 in which each of the splash bar retaining clips is bent to form the downward portion.*

*27. A cooling tower support grid for supporting at least one splash bar, comprising:*

*a lattice frame having a plurality of substantially rectangular openings formed between a first series of parallel bars and a second series of parallel bars; and*

*a splash bar retaining clip within one of the openings, the splash bar retaining clip having a first portion and a second downwardly-angled portion, the second downwardly-angled portion being positioned away from the lattice frame by the first portion, the second downwardly-angled portion adapted to engage the splash bar to selectively secure the splash bar against one of the second series of parallel bars within the lattice frame,*

*wherein the retaining clip is integrally formed with the frame to eliminate a need to handle the clip during operation,*

*in which the first portion of the retaining clip is resilient,*

*in which the first portion comprises a resilient finger angled upwardly, and the downwardly angled portion is a downwardly bent portion.*

*28. A cooling tower support grid, comprising:*

*a lattice frame having a first series of bars which intersect a second series of bars to form a plurality of openings;*

*splash bar retaining clips integrally formed as part of the lattice frame the retaining clips being placed into at least two laterally spaced openings of the lattice frame, and;*

*each of the retaining clips having an engaging portion extended from the lattice frame, the engaging portion adapted to engage the splash bar to selectively secure the splash bar against the lattice frame,*

*in which the engaging portion includes a downwardly facing portion, and*

*in which the engaging portion comprises a resilient finger angled upwardly.*

* * * * *